US007299260B2

(12) United States Patent
Shino

(10) Patent No.: US 7,299,260 B2
(45) Date of Patent: Nov. 20, 2007

(54) APPARATUS AND METHOD FOR RECEIVING E-MAIL

(75) Inventor: Tomonori Shino, Fujisawa (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 753 days.

(21) Appl. No.: 10/103,968

(22) Filed: Mar. 25, 2002

(65) Prior Publication Data

US 2002/0152274 A1    Oct. 17, 2002

(30) Foreign Application Priority Data

Apr. 12, 2001  (JP)  ............................. 2001-114106

(51) Int. Cl.
*G06F 15/16*    (2006.01)

(52) U.S. Cl. ...................... 709/206; 709/217; 709/218; 709/219; 358/400; 358/402; 358/404

(58) Field of Classification Search ............ 379/93.24, 379/100.08; 709/206, 217–219; 358/400, 358/402, 404
See application file for complete search history.

(56) References Cited

U.S. PATENT DOCUMENTS

| 5,331,424 | A | * | 7/1994 | Matsui et al. ................ 358/404 |
| 5,548,789 | A | * | 8/1996 | Nakanura .................... 709/206 |
| 5,881,233 | A | | 3/1999 | Toyoda et al. |
| 6,025,931 | A | * | 2/2000 | Bloomfield ................. 358/402 |
| 6,094,277 | A | | 7/2000 | Toyoda |
| 6,128,101 | A | | 10/2000 | Saito |
| 6,141,695 | A | * | 10/2000 | Sekiguchi et al. .......... 709/246 |
| 6,182,118 | B1 | | 1/2001 | Finney et al. |
| 6,363,415 | B1 | | 3/2002 | Finney et al. |
| 6,411,393 | B1 | * | 6/2002 | Wakasugi ................... 358/1.15 |
| 6,496,573 | B1 | | 12/2002 | Ichimura |
| 6,594,032 | B1 | * | 7/2003 | Hiroki et al. ............... 358/1.15 |
| 6,625,642 | B1 | * | 9/2003 | Naylor et al. ................ 709/206 |

(Continued)

FOREIGN PATENT DOCUMENTS

EP    1022894    7/2000

(Continued)

OTHER PUBLICATIONS

English Language Abstract of JP 8-242326, Sep. 17, 1996.

(Continued)

*Primary Examiner*—Nathan Flynn
*Assistant Examiner*—Mohamed Wasel
(74) *Attorney, Agent, or Firm*—Greenblum & Bernstein, P.L.C.

(57) ABSTRACT

A mail retrieval moderator instructs an image memory usage rate calculator to calculate a usage rate of an image memory, and determines whether the usage rage is greater than or equal to 98%. When the answer is "Yes", there is a risk that the image memory will have a memory overflow if more e-mail is retrieved from the POP3 server. Thus, a timer is reset and the control returns to ST501. When the answer is "No", there is no risk that the image memory will have a memory overflow even if more e-mail is retrieved from the POP3 server. Thus, e-mail is retrieved from the POP3 server. Accordingly, the apparatus and method for receiving e-mail is capable of securely retrieving e-mail from the mail server, even with a relatively small memory capacity.

16 Claims, 17 Drawing Sheets

U.S. PATENT DOCUMENTS

| | | | |
|---|---|---|---|
| 6,690,480 B2 * | 2/2004 | Maeda | 358/1.15 |
| 6,701,353 B1 * | 3/2004 | Block | 709/219 |
| 6,785,867 B2 * | 8/2004 | Shaffer et al. | 715/516 |
| 6,898,627 B1 * | 5/2005 | Sekiguchi | 709/217 |
| 6,965,921 B2 * | 11/2005 | Lu et al. | 709/206 |
| 7,023,586 B2 * | 4/2006 | Eguchi | 358/402 |
| 7,100,195 B1 * | 8/2006 | Underwood | 726/2 |
| 7,142,323 B2 * | 11/2006 | Ogawa | 358/1.15 |
| 2001/0000441 A1 * | 4/2001 | Zinkov et al. | 358/1.15 |
| 2002/0012424 A1 * | 1/2002 | Nishio et al. | 379/100.06 |
| 2002/0023138 A1 * | 2/2002 | Quine et al. | 709/206 |
| 2002/0144154 A1 * | 10/2002 | Tomkow | 713/201 |

FOREIGN PATENT DOCUMENTS

| | | |
|---|---|---|
| EP | 1030508 | 8/2000 |
| EP | 1061701 | 12/2000 |
| JP | 8-242326 | 9/1996 |
| JP | 11-004250 | 1/1999 |
| JP | 11-065791 | 3/1999 |
| JP | 11-088635 | 3/1999 |
| JP | 11-308292 | 11/1999 |
| JP | 2000-059421 | 2/2000 |
| JP | 2000-078512 | 3/2000 |
| JP | 2000-209261 | 7/2000 |
| JP | 2000-216946 | 8/2000 |
| JP | 2000-278311 | 10/2000 |
| JP | 2000-295404 | 10/2000 |
| WO | 96/35994 | 11/1996 |

OTHER PUBLICATIONS

English Language Abstract of JP 11-065791, Mar. 9, 1999.
English Language Abstract of JP 11-308292, Nov. 5, 1999.
English language Abstract of JP 2000-209261, Jul. 28, 2000.
English language Abstract of JP 2000-216946, Aug. 4, 2000.
English language Abstract of JP 2000-278311, Oct. 6, 2000.
English language Abstract of JP 2000-059421, Feb. 25, 2000.
English language Abstract of JP 11-004250, Jan. 6, 1999.
English language Abstract of JP 2000-295404, Oct. 20, 2000.
English Language Abstract of JP 2000-078512, Mar. 14, 2000.
English language Abstract of JP 11-088635.

* cited by examiner

Fig. 11

Example of Mail Forwarding Report to Sender

- Forwarding Report-

The following mail item could not be received and has been forwarded:

| | |
|---|---|
| Date・Time | :2000 - 10 - 12  20:37:25 |
| Title | :Re:Request for Estimate |
| Sender | :kujira@iruka.com |
| Forwarded From | :katsuo@maguro.com |
| Forwarded To | :tai@hirame.com |

Fig. 13

Example of Mail Forwarding Report to Administrator

– Forwarding Report–

The following mail items have been forwarded:

Forwarded from:katsuo@maguro.com    Forwarded to:tai@hirame.com

| Date · Time | Title | Sender |
|---|---|---|
| 2000 - 10 - 12  20:37:25 | Re:Request for Estimate | kujira@iruka.com |
| 2000 - 10 - 12  23:17:34 | Inquiry on Products | kani@ebi.com |

Fig. 15

Example of Forwarding Report

— Forwarding Report—

The following mail items have been forwarded:

Forwarded from:katsuo@maguro.com     Forwarded to:tai@hirame.com

| Date · Time | Title | Sender |
|---|---|---|
| 2000 - 10 - 18  20:44:37 | Re:Request for Estimate | kujira@iruka.com |
| 2000 - 10 - 18  20:49:51 | Inquiry on Products | kani@ebi.com |

Fig. 17

Example of Mail for Retrieval Error

- Mail Retrieval Report -

For the following reasons, the mail cannot be retrieved from the POP server

| Error Code | Contents |
|---|---|
| 010 | Paper Jam |
| 879 | Memory Overflow |

APPARATUS AND METHOD FOR RECEIVING E-MAIL

BACKGROUND OF THE INVENTION

1. Field of the Invention

This invention relates to an apparatus and method for receiving e-mail.

2. Description of Related Art

Recently, internet facsimile terminal apparatuses (IFAX terminal apparatus) for e-mail that transmit/receive data via internet using e-mail, exemplified by disclosures in Japanese Laid Open Application 8-242326 and its corresponding U.S. Pat. No. 5,881,233, have become commercially available.

These IFAX terminal apparatuses are equipped with the same configurations and user interfaces as G3/G4 facsimile machines, which are normally used in offices and homes. And such an IFAX terminal apparatus is in one body, can be operated by an operation panel with numeric keys, one-touch buttons or the like, and provides information to users using a relatively small LCD screen.

The steps for receiving an e-mail using an IFAX terminal apparatus is briefly explained hereafter. An IFAX terminal apparatus accesses to a mail server for receiving mail (e.g., POP3 server), and while retrieving e-mail stored in a mailbox assigned to an individual mail account, the apparatus stores an attached image file (facsimile data) in its image memory. After finishing the e-mail reception, the apparatus extends the image file and outputs the same to a printer to print the e-mail.

However, conventional IFAX terminal apparatuses usually do not have a large capacity in a hard disk, unlike personal computers (PCs), and the image memory capacities to store image files are not necessarily sufficient. Therefore, when an image memory is having a memory overflow, such an apparatus is not capable of storing e-mail in the image memory, even if the apparatus has retrieved the e-mail from a mail server. Consequently, the e-mail cannot be printed.

Also, even if there is a risk to have a memory overflow, such an apparatus would still retrieve the e-mail, therefore, the e-mail will be deleted from the mail server and will become lost.

Further, during a memory overflow, e-mail cannot be received/printed normally. Therefore, it is not preferable to have such a problem for a long period of time.

The above-described problems are common not only to internet facsimile apparatuses, but also to e-mail reception apparatuses, without memory with large capacities as in hard disks, which receive e-mail using relatively small memory capacities.

This invention is provided in view of the above-described problems. The object of the present invention is to provide an e-mail reception apparatus and method for receiving e-mail that can securely retrieve e-mail from the mail server, even with a relatively small memory capacity.

SUMMARY OF THE INVENTION

To solve the above-described problem, the e-mail reception apparatus in the present invention calculates a usage rate of a memory that stores e-mail, checks whether the calculated usage rate is greater than or equal to a threshold value, with which there is a risk of a memory overflow if more e-mail items are to be retrieved, determines not to retrieve e-mail when the apparatus detects that the usage rate is greater than or equal to the threshold value, and retrieves e-mail when the apparatus determines that the usage rate is less than the threshold value.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 11 shows an example of a mail forwarding report to a sender prepared by the internet facsimile terminal apparatus according to the second embodiment of the present invention;

FIG. 13 shows an example of a mail forwarding report to an administrator prepared by the internet facsimile terminal apparatus according to the second embodiment of the present invention;

FIG. 15 shows an example of a forwarding report prepared by the internet facsimile terminal apparatus according to the second embodiment of the present invention;

FIG. 17 shows an example of a mail to report on a mail retrieval error prepared by the internet facsimile terminal apparatus according to the second embodiment of the present invention;

DETAILED DESCRIPTION OF PREFERRED EMBODIMENTS

The embodiments of the present invention are further explained in the following, in reference to the above-described drawings.

First Embodiment

Figure 1:
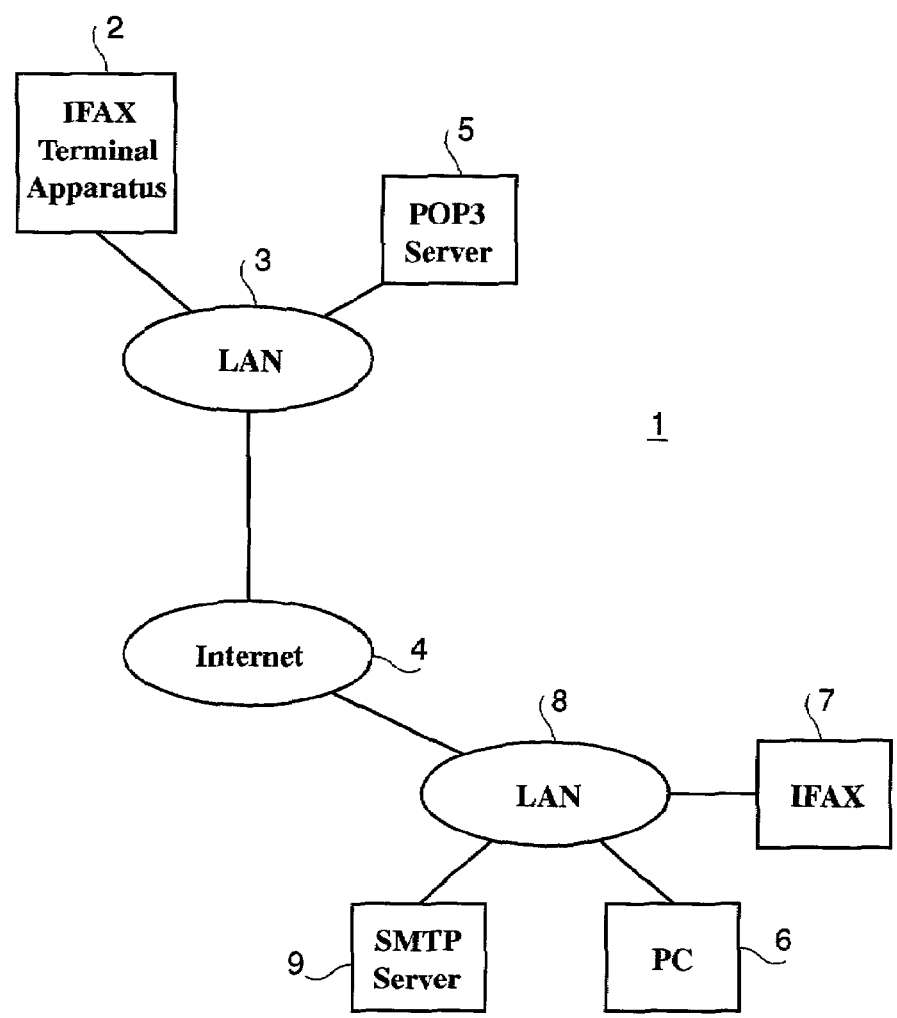
FIG. 1 is a conceptual rendering illustrating a computer network system in which an internet facsimile terminal apparatus operates according to the first embodiment of the present invention.

FIG. 1 is a conceptual rendering illustrating a computer network system in which an internet facsimile terminal apparatus operates according to the first embodiment of the present invention.

In a system 1 of FIG. 1, an internet facsimile (IFAX) terminal apparatus 2 is connected to the internet 4 via a local area network (LAN) 3.

In the LAN 3, a mail account (mail address) is assigned to the internet facsimile terminal apparatus 2, and a POP (Post Office Protocol) 3 server 5 is equipped to receive and store e-mail designated to the mail account.

The internet 4 is connected to PC 6, IFAX 7, or the like, which transmit e-mail to the internet facsimile terminal apparatus 2, via a LAN 8. A SMTP server 9 for a mail server of sending side is connected to the LAN 8.

In the system 1, the internet facsimile terminal apparatus 2 is connected to the internet 4 via the LAN 3, however, the method of connection is not limited to the above. For example, by connecting to an internet connection provider (ISP) via a public system telephone network (PSTN), or an ISDN (integrated service digital network), the internet facsimile terminal apparatus 2 can access the internet 4 through the ISP.

In the system 1 as described above, when the IFAX 7 or the PC 6 is transmitting a piece of image information as an e-mail item to the internet facsimile terminal apparatus 2, the mail account of the internet facsimile terminal apparatus 2 becomes a destination and the e-mail item with the attached image information is transmitted to the POP3 server 5, via SMTP server 9. The POP3 server 5 stores the received e-mail item in a mailbox for the mail account of the internet facsimile terminal apparatus 2. The internet facsimile terminal apparatus 2 periodically or according to the receiver's instruction, accesses the POP3 server 5. The communication with the POP3 server 5 follows a POP3 protocol, one of the e-mail forwarding protocols; however, the method is not limited to the above. If there is an e-mail item stored in the mailbox, the internet facsimile terminal apparatus 2 receives the e-mail item and prints the contents of the same.

In the first embodiment, the e-mail items that the internet facsimile terminal apparatus 2 receives are e-mail items with attached image files. These e-mail items adhere to standards such as MIME (Multipurpose Internet Mail Extensions), and the image files are stored in the attached file parts after they are transformed into character codes using a format such as Base 64 format. Each part, such as a text part and an attached file part, is divided according to a boundary defined by the header. Further, the format of the image files is TIFF-FX format, in compliance with the RFC2301 standard of IETF.

The image files of the TIFF-FX format (TIFF files) is composed of multi-page structure. Additionally, every scanned page is compressed by the compression format that is normally used for facsimile communication, such as MH, MR, and MMR. Such compressed image information (compressed image data) is orderly inserted in each page area (between sub-headers, IFD) of the TIFF file. In other words, e-mail using IFAX has multiple of compressed image data, to correspond to each page of the document, which is converted into a TIFF file and attached to the e-mail.

Figure 2:
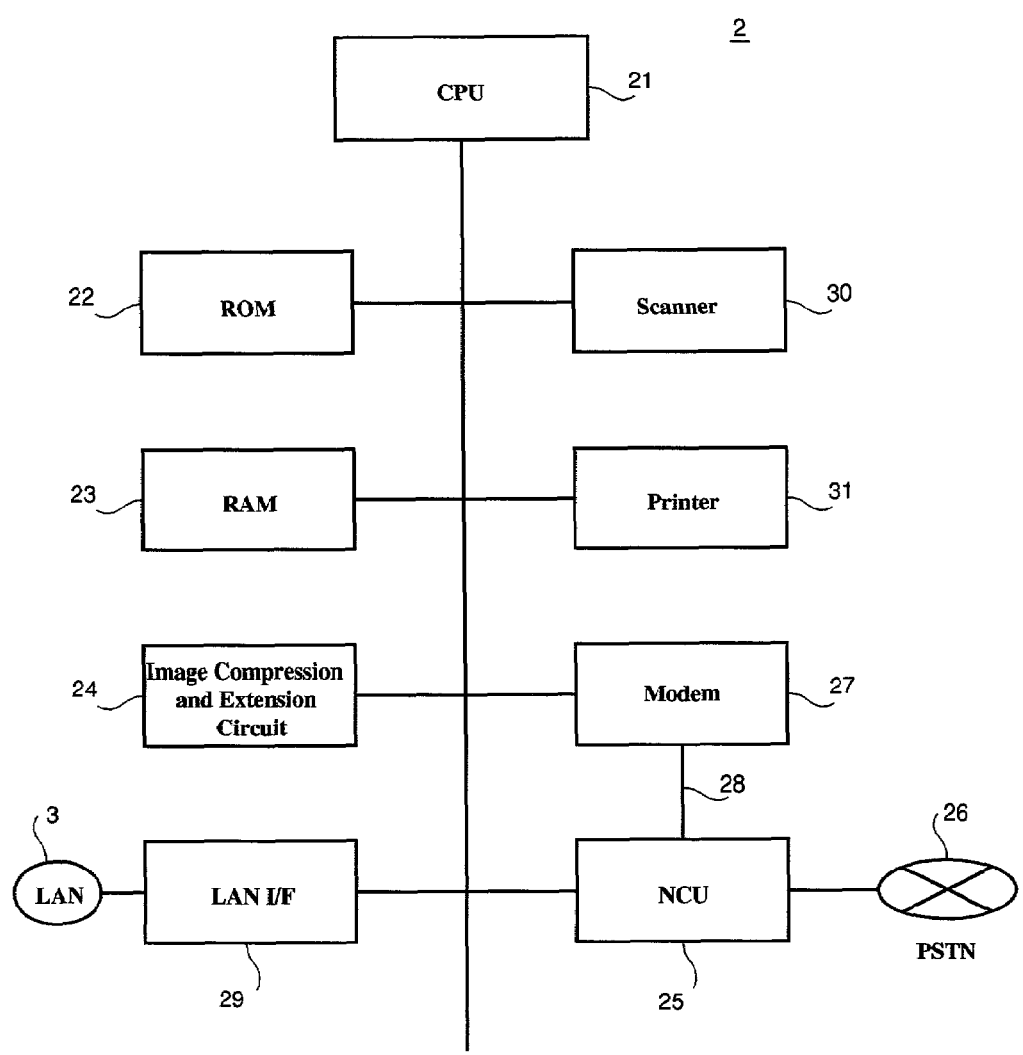
FIG. 2 is a block diagram illustrating hardware of the internet facsimile terminal apparatus according to the first embodiment of the present invention.

FIG. 2 is a block diagram illustrating hardware of the internet facsimile terminal apparatus according to the first embodiment of the present invention. In the internet facsimile terminal apparatus 2, a CPU 21 operates a program and controls the entire apparatus. A ROM 22 stores the program that CPU 21 operates.

A RAM 23 has a work area to operate the program and a buffer area that temporarily stores various data such as e-mail and compressed image data.

An image compression and extension circuit 24 compresses transmitting image information using MH, MR, MMR, etc., and extends compressed image information received into the original image information.

A network control unit (NCU) 25 is connected to a PSTN 26. A modem 27 is connected to this network control unit 25, via an analog signal line 28. The modem 27 modulates and demodulates various data that is transmitted to and received from the other facsimile apparatus via the PSTN 26.

A LAN interface 29 controls data transmission and reception via the LAN 3. A scanner 30 scans a document and obtains the image information. A printer 31 prints various data including received image information.

Figure 3:
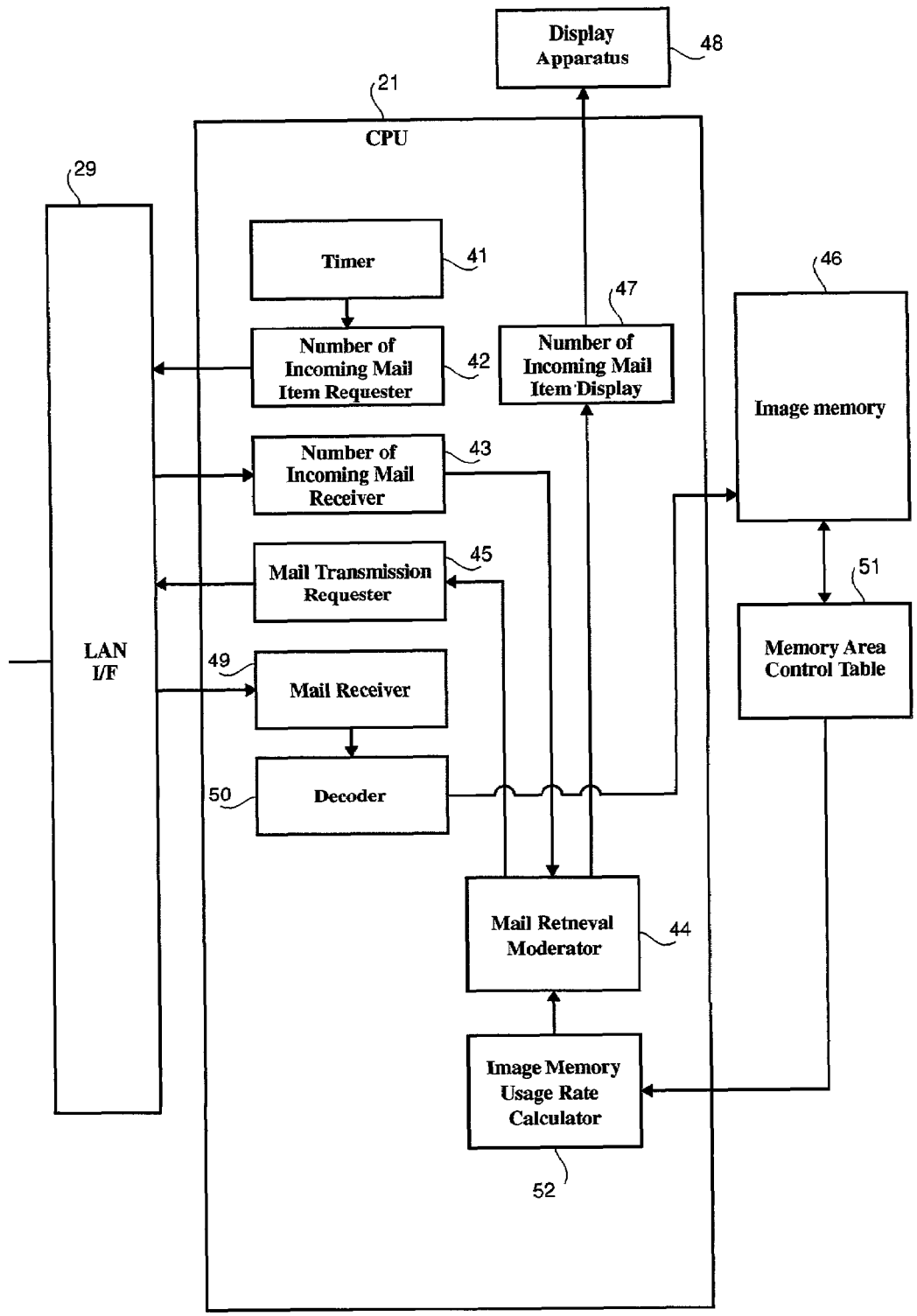
FIG. 3 is a block diagram illustrating an e-mail reception function of the internet facsimile terminal apparatus according to the first embodiment of the present invention.

FIG. 3 is a block diagram illustrating an e-mail reception function of the internet facsimile terminal apparatus according to the first embodiment of the present invention. An e-mail reception function is achieved by a program that operates on the IPU 21.

A timer 41 counts a lapse of time from the previous check, to check incoming mail periodically in the POP3 server 5. After an expiration of a predetermined time interval, the timer 41 notifies a number of incoming mail item requester 42 of the expiration. The number of incoming mail item requester 42 requests, via the LAN interface 29, the POP3 server 5 to notify a number of incoming mail items. Specifically, the number of incoming mail item requester 42 transmits a STAT command or a LIST command of the POP3 protocols to the POP3 server 5.

A receiver for a number of incoming mail items 43 receives the information on a number of incoming mail items that is transmitted by the POP3 server 5 via the LAN interface 29, according to the request by the number of incoming mail item requester 42, and delivers the information on the number of incoming mail items to a mail retrieval moderator 44.

The mail retrieval moderator 44 checks, from the information on the number of incoming mail items, whether there is an incoming mail item in the POP3 server 5, and, if there is an incoming mail item, instructs a mail transmission requester 45 to retrieve the mail item. Prior to this guidance, whether there is a risk of a memory overflow in an image memory 46 is checked, and if there is a risk of a memory overflow, the mail retrieval moderator 44 will not give instructions to retrieve the incoming mail item. This procedure is later explained in detail.

The mail retrieval moderator 44 also delivers, if there is an incoming mail item, the information on the number of incoming mail items to a number of incoming mail item display 47. The number of incoming mail item display 47 displays the delivered information on the number of incoming mail items, on a display apparatus (e.g., LCD equipped on an operation panel) 48.

The mail transmission requester 45 requests the POP3 server 5 to transmit an e-mail item via the LAN interface 29. More specifically, the mail transmission requester 45 transmits a RETR command of the POP3 protocols to the POP3 server 5.

According to the request by the mail transmission requester 45, a mail receiver 49 receives the e-mail item transmitted by the POP3 server 5 via the LAN interface 29, and delivers the same to a decoder 50.

The decoder 50 decodes an image file that is coded into a character code by the Base 64 format from the sending side, and attached according to the MIME. The decoder 50 stores the decoded image file in the image memory 46.

A memory area control table 51 is used to manage the usage of the memory area in the image memory 46.

Figure 4:
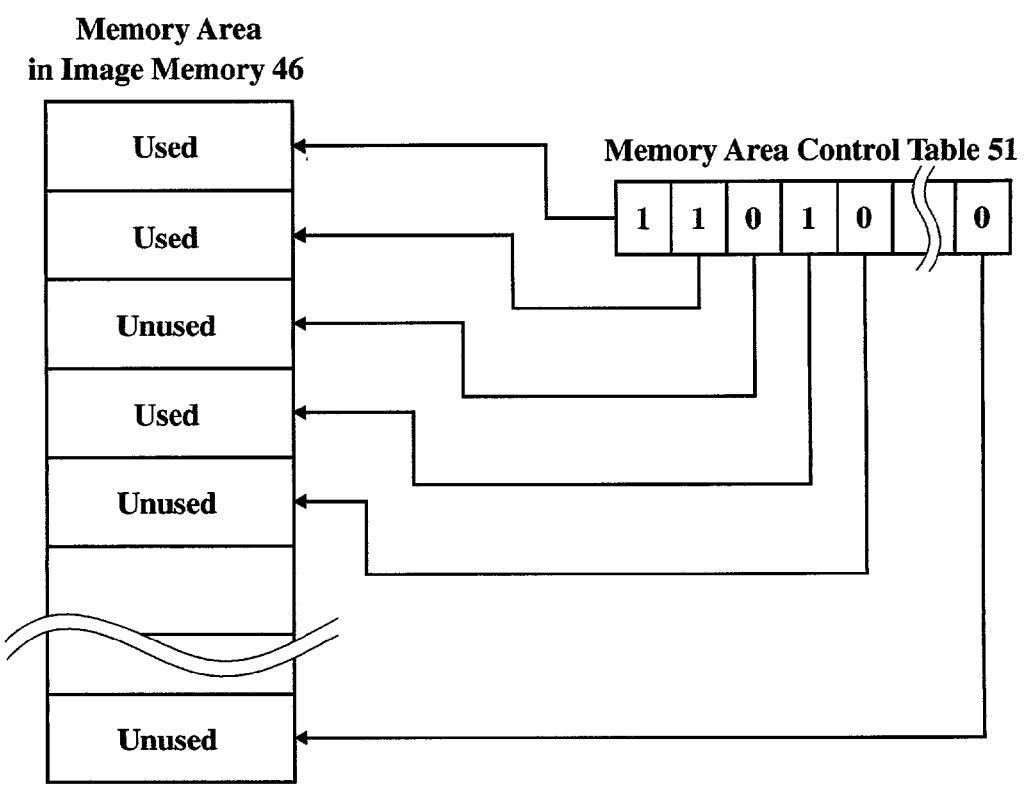
FIG. 4 shows a memory area control table of the internet facsimile terminal apparatus according to the first embodiment of the present invention.

FIG. 4 shows a memory area control table of the internet facsimile terminal apparatus according to the first embodiment of the present invention. The memory area control table 51 includes a register of a number of addresses that corresponds to a number of memory areas in the image memory 46. When data is written in a memory area, the corresponding address is set to "1" (on), and when the data is erased in the memory area and released, the address is set to "0" (off). A image memory usage rate calculator 52 calculates a usage rate (%) of the image memory 46, from a ratio of the addresses set to "1" in the entire addresses of the memory area control table 51.

The mail retrieval moderator 44, when the memory usage rate calculated by the image memory usage rate calculator 52 is greater than or equal to the predetermined value (threshold value), with which the image memory 46 would have a risk of a memory overflow if e-mail is retrieved from the POP3 server 5, determines not to retrieve any e-mail even if there are incoming mail items in the POP3 server 5. The threshold value is determined by a ratio of currently used memory to an entire memory capacity, and in this example, the predetermined value is set to 98%.

Figure 5:
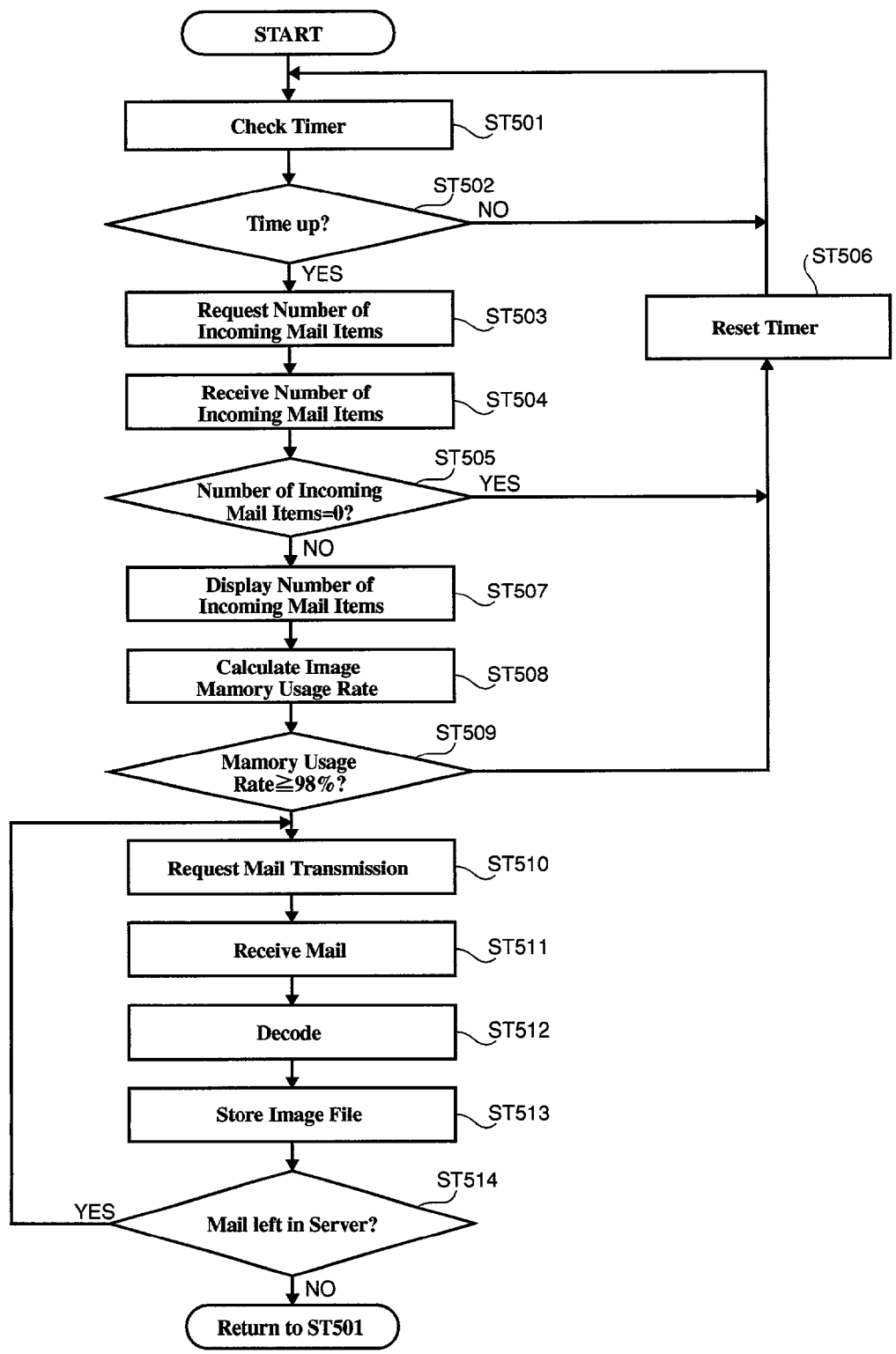
FIG. 5 is a flowchart illustrating steps for the e-mail reception performed by the internet facsimile terminal apparatus according to the first embodiment of the present invention.

FIG. 5 is a flowchart illustrating steps for the e-mail reception performed by the internet facsimile terminal apparatus according to the first embodiment of the present invention. The number of incoming mail item requester 42 checks the timer 41 (ST501), and checks whether the time is up (ST502). If the time is up, the number of incoming mail item requester 42 requests the POP3 server 5 for the number of incoming mail items (ST503). If the time is not up, the control returns to ST501.

The number of incoming mail item receiver 43 receives information on the number of incoming mail items returned by the POP3 server 5 (ST504). The number of incoming mail item receiver 43 delivers the received information on the number of incoming mail items to the mail retrieval moderator 44.

The mail retrieval moderator 44 checks whether the number of incoming mail items is zero, based on the delivered information on the number of incoming mail items (ST505). If the answer is "Yes", the timer 41 is reset (ST506), and the control returns ST501 to wait for another time up. On the other hand, if the answer is "No", the information on the number of incoming mail items is delivered to the number of incoming mail item display 47, and the number of incoming mail items is displayed on the display apparatus 48 (ST507).

The mail retrieval moderator 44, then instructs the image memory usage rate calculator 52 to calculate a usage rate of the image memory 46 (ST508). Next, whether the usage rate is greater than or equal to 98% is checked (ST509). If the answer is "Yes", since there is a risk for the image memory 46 to have a memory overflow when more e-mail is retrieved from the POP3 server 5, the timer 41 is reset (ST506), and the control returns to ST501. On the other hand, if the answer is "No", since there is no risk that the image memory 46 would have a memory overflow even when more e-mail is to be retrieved from the POP3 server 5, the e-mail is retrieved from the POP3 server 5. Accordingly, as can be seen from these steps, no part of the e-mail is retrieved if there is a risk of memory overflow as a result of the decision in step ST509.

Specifically, the mail transmission requester 45 requests the POP3 server 5 for a transmission of an e-mail item (ST510). The mail receiver 49 receives the e-mail transmitted by the POP3 server 5 in response to the request (ST511), the decoder 50 decodes the image file attached to the received e-mail (ST512), and the decoded image file is stored in the image memory 46 (ST513). Subsequently, whether there are any e-mail items left in the POP3 server 5 is checked (ST514). If there are any e-mail items left, the reception procedure of ST510-ST513 is performed. If there is no e-mail left, the control returns to ST501 and waits for another time up.

As described above, according to the first embodiment of the present invention, after determining that there are e-mail items in the POP3 server 5 at ST505, the mail retrieval moderator 44 instructs the image memory usage rate calculator 52 to calculate the usage rate of the image memory 46 at ST508. Whether the usage rate at ST509 is greater than or equal to the threshold value, in other words, whether there is a risk for the image memory 46 to have a memory overflow, if more e-mail is retrieved from the POP3 server 5, is checked. If the answer is "Yes", e-mail retrieval (ST510-ST514) will not be performed. Accordingly, it is possible to prevent an inconvenient circumstance when the image memory 46, with a risk of having a memory overflow, retrieve e-mail from the POP3 server 5, but fails to store the image file in the image memory 46 and to print the e-mail.

Further, even if the received e-mail is set to be erased from the POP3 server 5 after completing a normal e-mail reception, when there is a risk for a memory overflow, the apparatus does not perform e-mail retrieval. Therefore, it is possible to avoid a situation that e-mail is erased from a mail server and becomes lost.

As a result, in accordance with the internet facsimile terminal apparatus according to the first embodiment of the present invention, even the image memory 46 with a relatively small memory capacity is able to retrieve e-mail securely from the POP3 server 5 and print the same.

Second Embodiment

Figure 6:
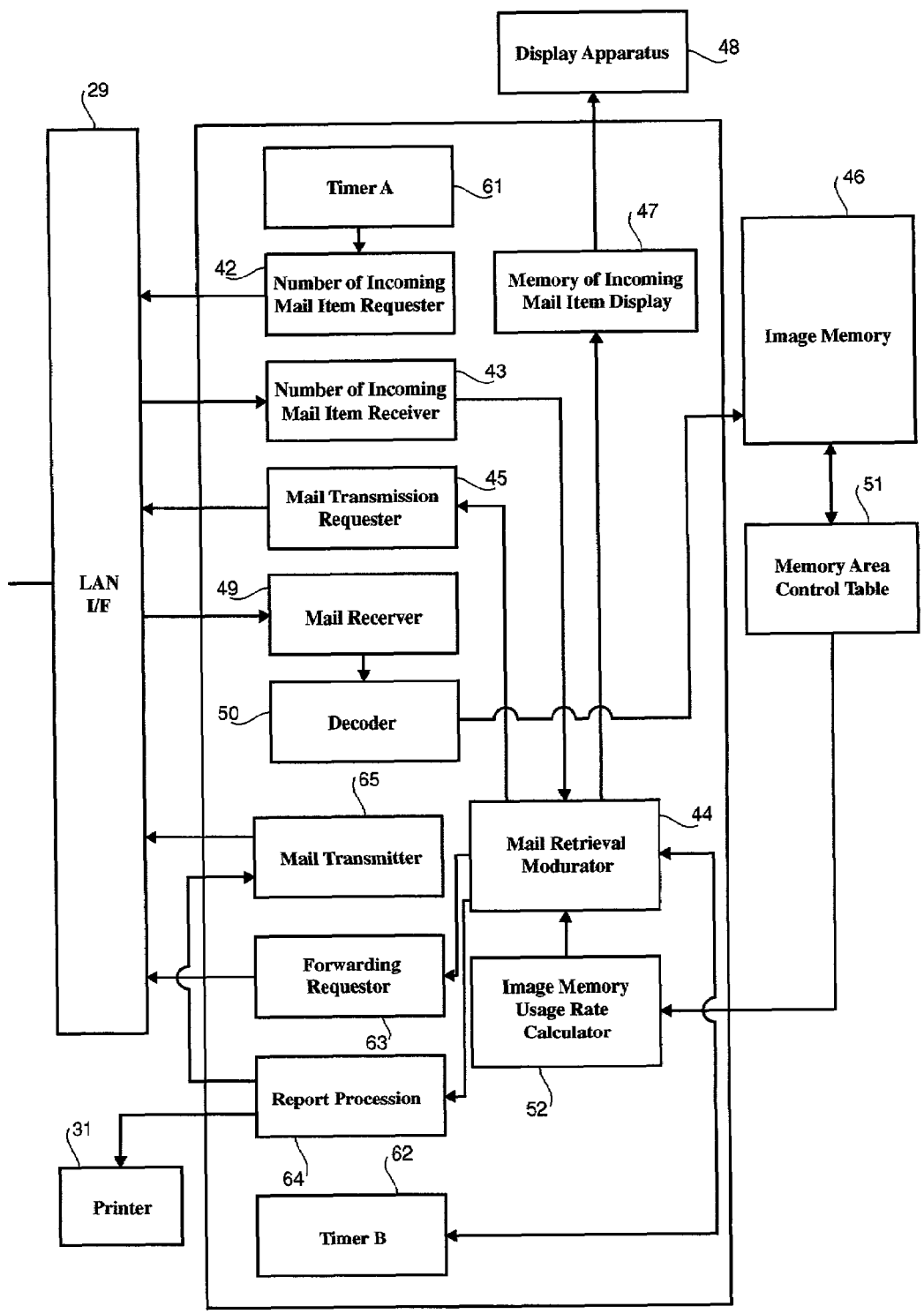
FIG. 6 is a block diagram illustrating an e-mail reception function of the internet facsimile terminal apparatus according to the second embodiment of the present invention.

FIG. 6 is a block diagram illustrating an e-mail reception function of the internet facsimile terminal apparatus according to the second embodiment of the present invention. Some structural portions in FIG. 6 have the same numerals as in the FIG. 3 of the above-described first embodiment; therefore, the repetitive explanation is omitted.

The internet facsimile terminal apparatus according to the second embodiment of the present invention is different from the above-described first embodiment in FIG. 3 as follows. In addition to a timer A 61 that counts a lapse of time from a previous request for a number of incoming mail items in the same way as the timer 41 of the first embodiment, there is a timer B 62 that counts a lapse of time from the time when a determination not to retrieve e-mail is made, because the usage rate of the image memory 46 is greater than or equal to 98% ("Yes" from ST509 in FIG. 5).

Also, the internet facsimile terminal apparatus according to the second embodiment of the present invention is equipped with a forwarding requester 63, a report processor 64, and a mail transmitter 65. The forwarding requester 63, when e-mail retrieval is not performed because the usage rate of the image memory 46 is not less than 98%, even after an expiration of a predetermined time interval at the timer B 62, requests the POP3 server 5 to forward the e-mail to the predetermined destination.

On the other hand, the report processor 64 prepares reports regarding a forwarding request made by the forwarding requester 63, and regarding a situation that e-mail retrieval is not performed because the usage rate of the image memory 46 is not less than 98%, even after an expiration of a predetermined time interval at the timer B 62. More specifically, a message including these contents of the report are prepared and transmitted to the sender of the e-mail that cannot be retrieved, and to a pre-registered destination by the mail transmitter 65. Also, the forwarding request and the report on retrieval error are printed by the printer 31.

Figure 7:
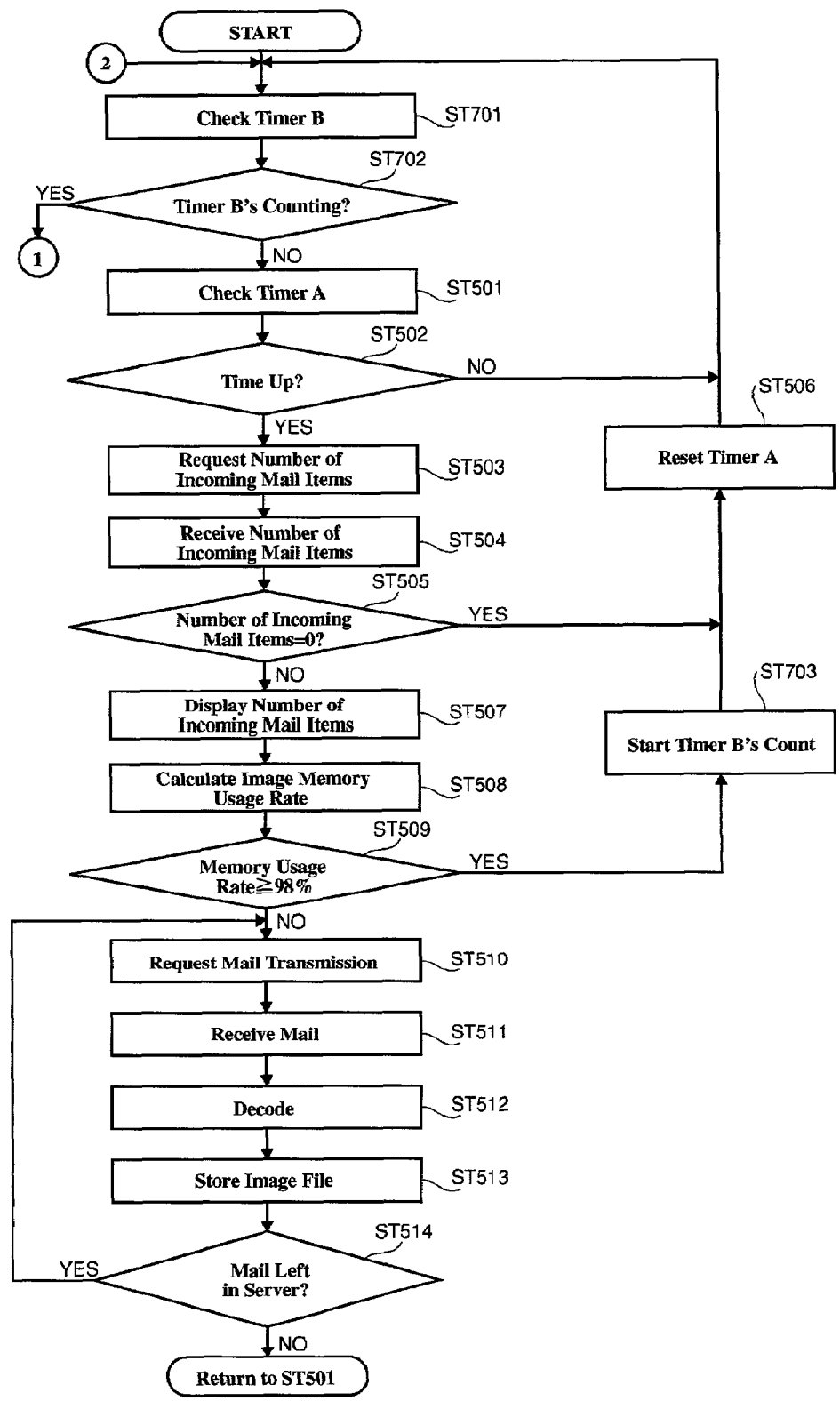
FIG. 7 is a flowchart illustrating steps for the e-mail reception performed by the internet facsimile terminal apparatus according to the second embodiment of the present invention.

FIG. 7 is a flowchart illustrating steps for the e-mail reception performed by the internet facsimile terminal apparatus according to the second embodiment of the present invention. Some steps in FIG. 7 have the same numerals as in the FIG. 5 of the above-described first embodiment; therefore, the repetitive explanation is omitted. Prior to checking the timer A 61 to determine whether the time is up at ST501 and ST502, the timer B 62 is checked (ST701) to determine whether the timer B 62 is counting (ST702). Normally, since the timer B 62 is not counting, the control proceeds to ST501.

After a confirmation process of a number of incoming mail items of ST501-ST505, if there are any incoming mail items ("Yes" at ST505), the number of incoming mail items is displayed on the display apparatus (ST507), a usage rate of the image memory 46 is calculated (ST508), and whether the usage rate is greater than or equal to 98% is checked (ST509). In the second embodiment of the present invention, if the usage rate of the image memory 46 is greater than or equal to 98%, the timer B 62 starts counting (ST703). Then, after resetting the timer A 61 (ST506), the control returns to ST701.

Figure 8:
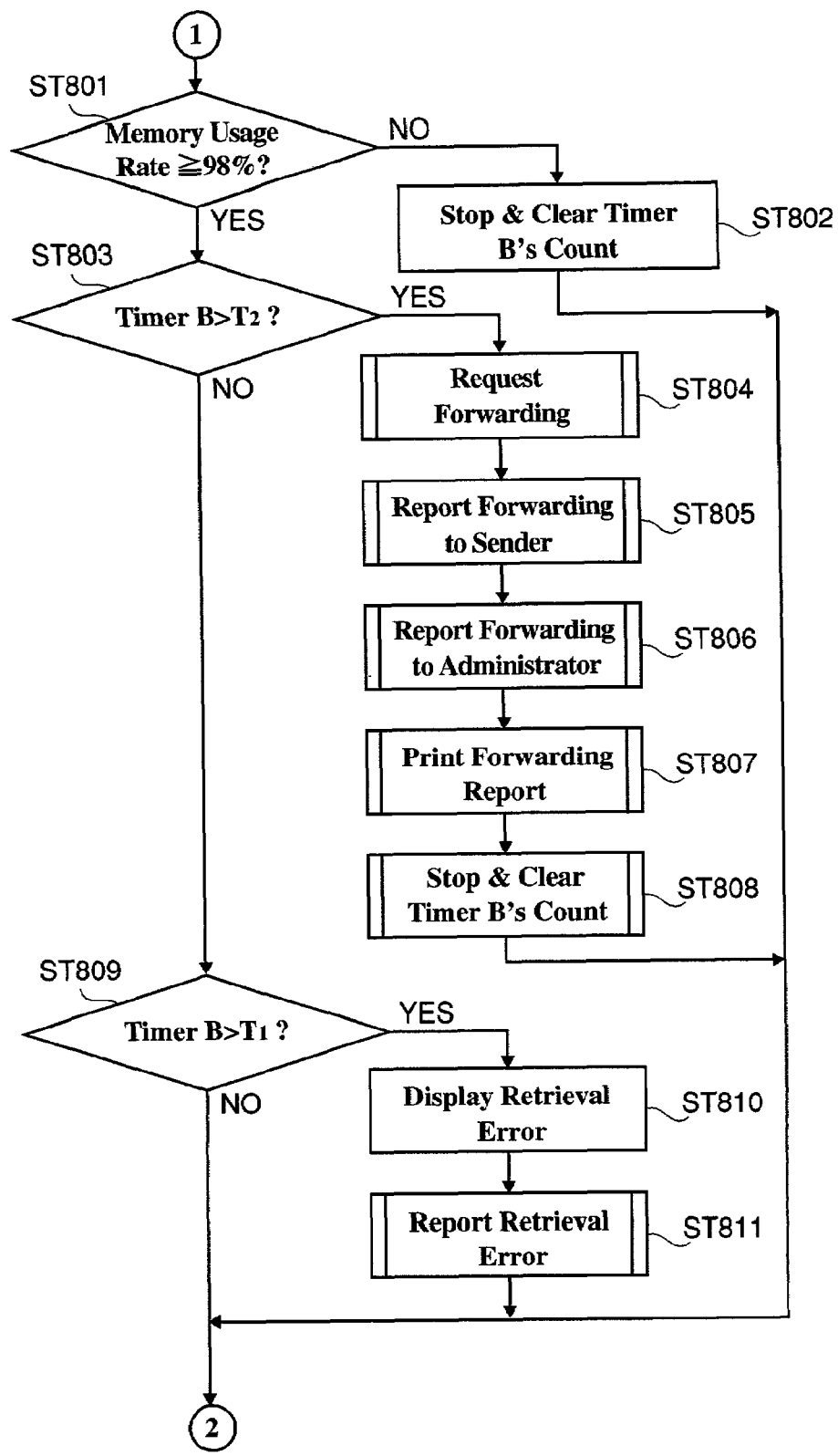
FIG. 8 is a flowchart illustrating an operation when a memory overflow is detected, performed by the internet facsimile terminal apparatus according to the second embodiment of the present invention.

When the timer B 62 starts counting, the answer for ST702 becomes "Yes", and the control proceeds to ST801 of FIG. 8.

FIG. 8 is a flowchart illustrating an operation when a memory overflow is detected, performed by the internet facsimile terminal apparatus according to the second embodiment of the present invention. At this time, the mail retrieval moderator 44 first re-examines whether a usage rate of the image memory 46 is greater than or equal to 98% (threshold value). If the answer is "No", the mail retrieval moderator 44 determines that image memory 46 has a newly opened area so that the image memory 46 will not have a memory overflow when more e-mail is retrieved. Therefore, the timer B 62 stops and clears the counts (ST802), and the control returns to ST701 in FIG. 7.

On the other hand, when the answer is "Yes" at ST801, the mail retrieval moderator 44 checks whether the counting value of the timer B 62 has exceeded the predetermined time interval (T2) (ST803). If the answer is "Yes", the forwarding requester 63 requests the POP 3 server 5 to forward the incoming e-mail (ST804). Subsequently, the report processor 64 reports each forwarded transmission to the sender of the e-mail and to the administrator (ST805 and ST806). Further, the report processor 64 prints a forwarding report from the printer 31 (ST807). After the report, the timer B 62 stops and clears the counts (ST808), and the control returns to ST701 of FIG. 7. Each step of ST805, ST806, and ST807 is later described in detail.

If the answer is "No" at ST803, the mail retrieval moderator 44 checks whether the counting value of the timer B 62 has exceeded the predetermined time interval (T1) (ST809). If the answer is "Yes", the display apparatus 48 displays a message of an e-mail retrieval error (ST810), and a report is prepared to report the e-mail retrieval error to the administrator (ST811). This error report at ST811 is later described in detail. If the answer is "No", at ST809, the control returns to ST701.

Figure 9:
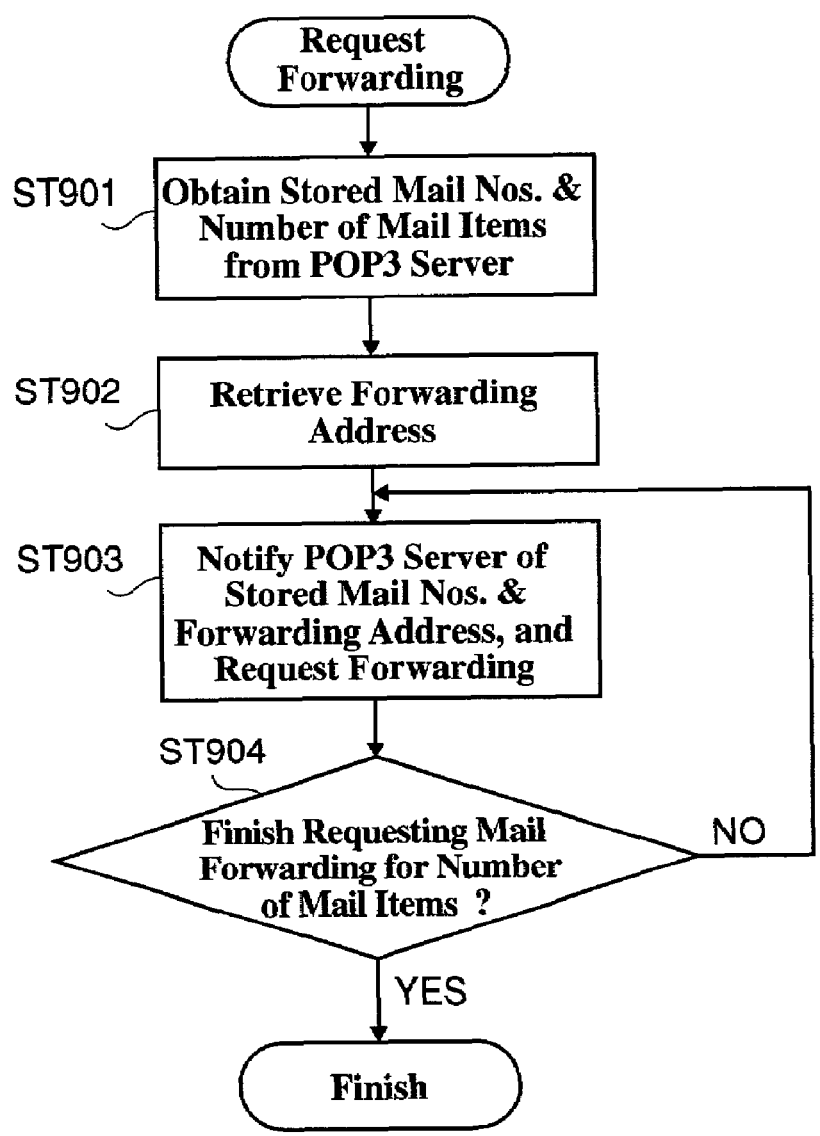
FIG. 9 is a flowchart illustrating steps for a forwarding request process performed by the internet facsimile terminal apparatus according to the second embodiment of the present invention.

FIG. 9 is a flowchart illustrating steps for a forwarding request process performed by the internet facsimile terminal apparatus according to the second embodiment of the present invention. First, the forwarding requester 63 obtains the stored e-mail (stored mail) numbers and the number of items that have arrived at the POP3 server 5 (ST901). Next, a forwarding address that is pre-registered in the RAM 23 is retrieved (ST902). Then, the stored mail numbers and the forwarding address are notified to the POP3 server 5, and mail forwarding is requested (ST903). After that, whether the forwarding request is made for the number of obtained mail items obtained at ST901 is checked (ST904), and if there is stored mail remaining without being forwarded, the control returns to ST903. ST903 and ST904 are repeated until all of the forwarding requests are made for the store mail.

Figure 10:
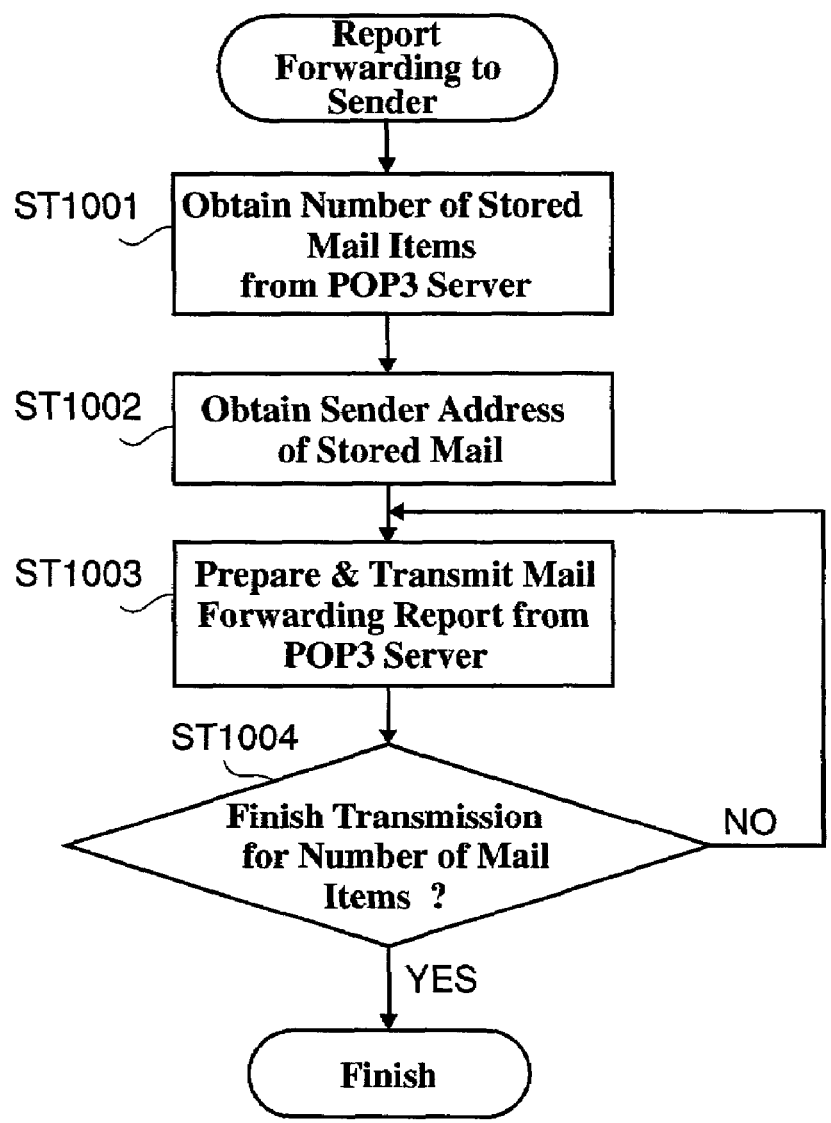
FIG. 10 is a flowchart illustrating steps for reporting mail forwarding to a sender performed by the internet facsimile terminal apparatus according to the second embodiment of the present invention.

FIG. 10 is a flowchart illustrating steps for reporting mail forwarding to a sender performed by the internet facsimile terminal apparatus according to the second embodiment of the present invention. First, the report processor 64 obtains the number of stored mail items from the POP3 server 5 (ST1001), and the sender's address of the stored mail from the POP3 server 5 (ST1002). Next, the report processor 64 prepares a mail forwarding report to a sender, as shown in FIG. 11, and transmits the same to the sender's address from the mail transmitter 65 (ST1003). Subsequently, whether a mail forwarding report is prepared for the number of mail items obtained at ST1001 is checked (ST1004). ST1003 and ST1004 are repeated until all of the forwarding reports are made for the stored mail.

Figure 12:
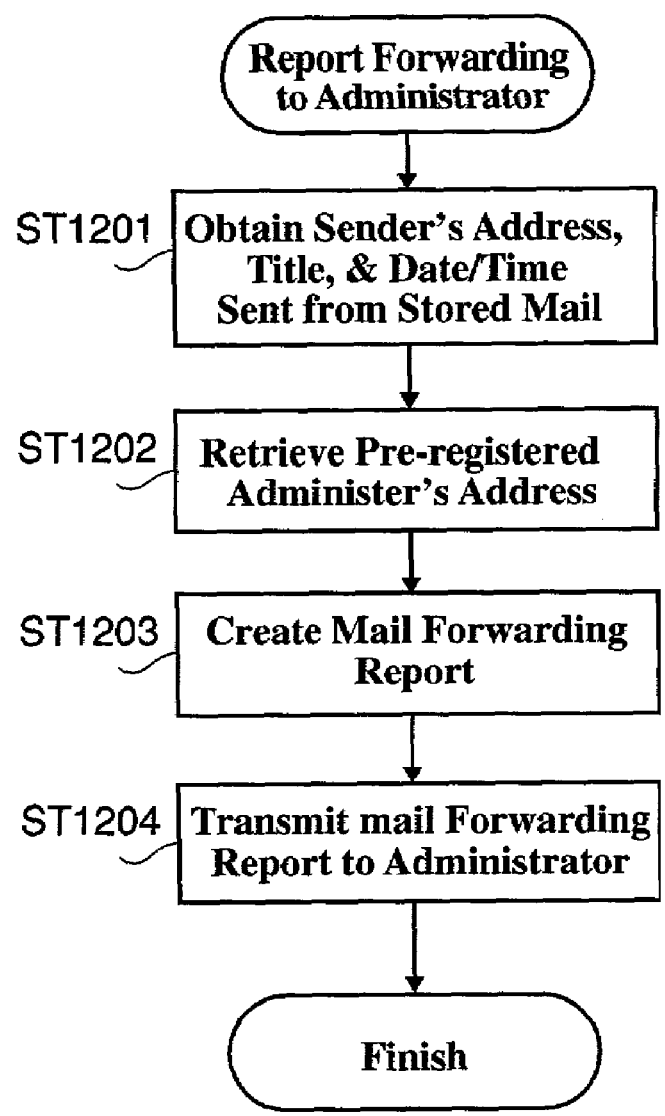
FIG. 12 is a flowchart illustrating steps for reporting mail forwarding to an administrator performed by the internet facsimile terminal apparatus according to the second embodiment of the present invention.

FIG. 12 is a flowchart illustrating steps for reporting mail forwarding to an administrator performed by the internet facsimile terminal apparatus according to the second embodiment of the present invention. First, the report processor 64 obtains information of the stored mail such as the sender's address, title, and date and time sent, from the POP3 server 5 (ST1201). And the report processor 64 retrieves an administrator's address that is pre-registered in the RAM 23 (ST1202). Then, the report processor 64 prepares a mail forwarding report to the administrator, as shown in FIG. 13 (ST1203), and transmits the same to the administrator's address from the mail transmitter 65 (ST1204).

Figure 14:
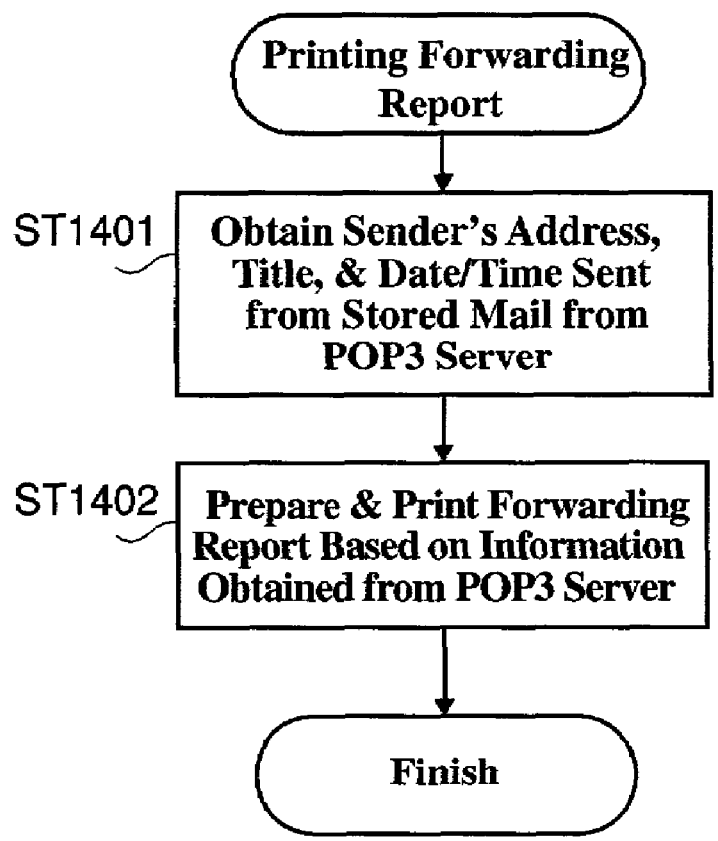
FIG. 14 is a flowchart illustrating steps for printing a forwarding report performed by the internet facsimile terminal apparatus according to the second embodiment of the present invention.

FIG. 14 is a flowchart illustrating steps for printing a forwarding report performed by the internet facsimile terminal apparatus according to the second embodiment of the present invention. First, the report processor 64 obtains information of the stored mail such as the sender's address, title, and date and time sent, from the POP3 server 5

(ST1401). Next, based on the information obtained from the POP3 server 5, a forwarding report is prepared, as shown in FIG. 15, and printed (ST1402).

Figure 16:
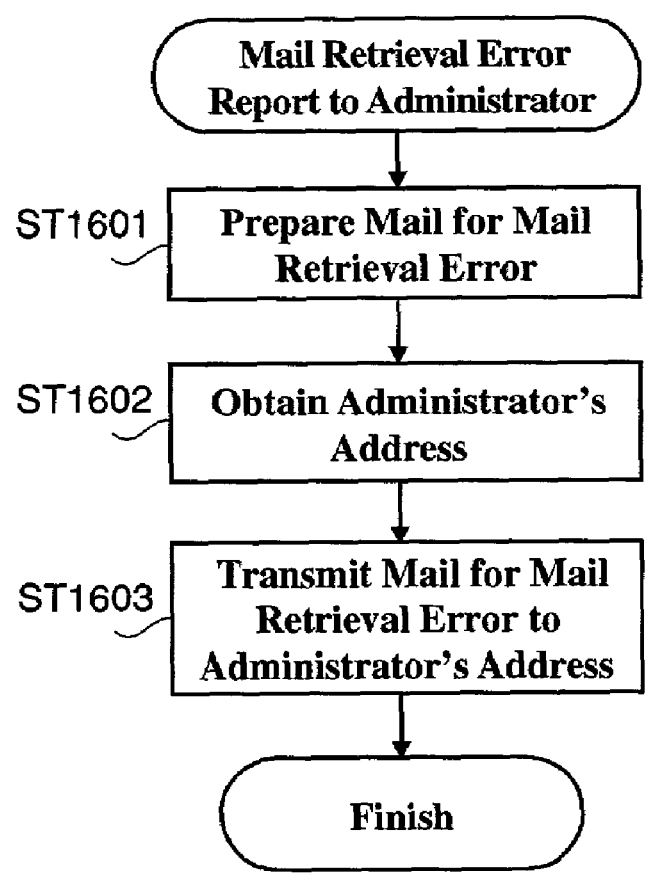
FIG. 16 is a flowchart illustrating steps for reporting a mail retrieval error to an administrator performed by the internet facsimile terminal apparatus according to the second embodiment of the present invention.

FIG. 16 is a flowchart illustrating steps for reporting a mail retrieval error to an administrator performed by the internet facsimile terminal apparatus according to the second embodiment of the present invention. First, the report processor 64 prepares mail for a mail retrieval error, as shown in FIG. 17 (ST1601). Next, the report processor 64 retrieves the administrator's address that is pre-registered in the RAM 23 (ST1602), and then transmits the mail for the mail retrieval error to the administrator's address from the mail transmitter 65 (ST1603).

As described above, according to the second embodiment of the present invention, as shown in ST804 of FIG. 8 and FIG. 9, if e-mail retrieval is not performed during the predetermined time (T2) since the mail retrieval moderator 44 determines that the usage rate of the image memory 46 is greater than or equal to the threshold value, the mail retrieval moderator 44 instructs the forwarding requestor 63 to request the POP3 server 5 to forward the e-mail to the predetermined address. Thus, when the image memory 46 continues to have a risk of a memory overflow, the mail server is requested to forward mail. Therefore, it is possible to transmit e-mail to a person who needs the same quickly, and improve the communication efficiency.

Also, as shown in ST805 and FIG. 10, when the forwarding requester 63 requests the POP3 server 5 to forward mail, the report processor 64 reports the mail forwarding to the sender of the e-mail. Therefore, it is possible to communicate with a sender of the e-mail that the internet facsimile terminal apparatus requested to forward e-mail without retrieving the same.

Further, as shown in ST806 and FIG. 12, when the forwarding requester 63 requests the POP3 server 5 to forward mail, an administrator is notified of the same. Therefore, it is possible to notify an administrator that there has been a situation that the internet facsimile terminal apparatus was notable to retrieve e-mail and requested the POP3 server 5 to forward the same, and to take a corrective measure. In addition to reporting to an administrator, the report can be transmitted to a pre-registered address that has been set up for mail forwarding or the like.

Additionally, as shown in ST807 and FIG. 14, when the forwarding requester 63 requests to forward mail, a report, as shown in FIG. 15, containing information of the forwarded e-mail such as the title and the sender address, is printed. Therefore, it is possible to obtain information of e-mail forwarded by a user of the internet facsimile terminal apparatus.

Furthermore, as shown in ST809, ST810, and ST811 of FIG. 8, if e-mail retrieval is not performed during the predetermined time (T1) since the mail retrieval moderator 44 determines that the usage rate of the image memory 46 is greater than or equal to the threshold value, the report processor 64 reports to the administrator of the same. Therefore, it is possible to notify an administrator when the image memory 46 continues to have a risk of a memory overflow, and to take a corrective measure.

Here, it is preferable to appropriately set a predetermined time (T1) and wait for a period of time, instead of proceeding to prepare a report immediately after detecting an overflow. This is because, for example, even if the usage rate of the image memory 46 is greater than or equal to the threshold value due to the facsimile data being stored in the image memory 46, the data in the image memory 46 will be released once a facsimile transmission is completed, and it becomes possible to retrieve e-mail again.

In addition to reporting to an administrator, the report can be transmitted to a pre-registered address for a service center or the like.

Likewise, according to the second embodiment of the present invention, by performing forwarding and report processes when the image memory 46 continues to have a risk of a memory overflow, it is possible to transmit e-mail to a destination quickly, to solve a memory overflow as soon as possible, and to improve the communication efficiency.

The present invention is not limited to the above-described embodiments. For example, in the first and second embodiments of the present invention, the internet facsimile terminal apparatus 2 stores image files attached to e-mail in the image memory 46. However, the method is not limited to the above, and the present invention can also be applied to a situation when e-mail retrieved from the POP3 server 5 is directly stored in a memory. Thus, the present invention can be widely applied to e-mail reception apparatuses that retrieve e-mail from the POP3 server 5. Such e-mail reception apparatuses include mobile phones, PHS terminals, and personal data assistants (PDAs).

As known as a prior art, the present invention can be performed using general and commercially available digital computers and microprocessors that are programmed according to the art described in the above embodiments. Also, as known as prior art, the present invention is comprised of computer programs that are produced by people skilled in the art, based on the art described in the above embodiments.

Further, the scope of the present invention includes computer program products as storage media, which include commands utilized to program computers to perform the present invention. These storage media, which are exemplified flexible disks, laser disks, CD-ROMs, other magnetic disks, ROMs, RAMs, EPROMs, EEPROMs, magnetic laser cards, memory cards, and DVDs, are not limited to the above.

The present invention is not limited to the above-described embodiments, and various variations and modifications may be possible without departing from the scope of the present invention.

This application is based on the Japanese Patent Application No. 2001-114106, filed on Apr. 12, 2001, entire content of which is expressly incorporated by reference herein.

What is claimed is:

1. An e-mail reception apparatus connected to a server via a network, the e-mail reception apparatus comprising:

a memory configured to store e-mail retrieved from the server, the e-mail comprising a header and a body;

a controller configured to access the server to determine whether incoming e-mail, to be retrieved by the e-mail reception apparatus, is present in the server and, when it is determined that the incoming e-mail is present in the server, to determine whether or not a usage status of the memory meets a predetermined value; and an e-mail receiver configured to retrieve the e-mail from the server when the controller determines that the usage status meets the predetermined value;

wherein, when the controller determines that the usage status does not meet the predetermined value, the controller accesses the server after a predetermined time period to determine whether the incoming e-mail is present in the server, and retrieves no part of the e-mail, comprising the header and the body, from the server.

2. The e-mail reception apparatus according to claim 1, further comprising a counter, wherein the controller repeats accessing the server to determine whether the incoming e-mail to be retrieved by the e-mail reception apparatus is present in the server until the controller determines that the usage status meets the predetermined value, and the controller stops accessing the server and requests the server to forward the incoming e-mail present in the server to a predetermined address when the counter reaches a predetermined value.

3. The e-mail reception apparatus according to claim 2, the usage status of the memory comprising a memory usage rate.

4. The e-mail reception apparatus according to claim 3, the controller further comprising a calculator that calculates the memory usage rate based upon a ratio of amount of used memory area to a total area of the memory, and the predetermined value comprises whether the memory usage ratio is less than a predetermined ratio.

5. The e-mail reception apparatus according to claim 2, wherein the controller sends an e-mail report to a sender that sent the incoming e-mail present in the server, the e-mail report including information indicating that the incoming e-mail present in the server could not be received by the e-mail reception apparatus and was forwarded to the predetermined address.

6. The e-mail reception apparatus according to claim 2, wherein the controller sends an e-mail report to a predetermined address, the e-mail report including information indicating that the incoming e-mail present in the server was forwarded to the predetermined address.

7. The e-mail reception apparatus according to claim 2, further comprising a printer that prints a report including information indicating that the incoming e-mail present in the server was forwarded to the predetermined address.

8. The e-mail reception apparatus according to claim 7, the notice including at least one of a title and an identification of a sender of the e-mail.

9. The e-mail reception apparatus according to claim 2, the controller sending an e-mail report to a predetermined address, the e-mail report including information indicating that the incoming e-mail present in the server could not be received by the e-mail reception apparatus and a reason why the incoming e-mail present in the server could not be received by the e-mail reception apparatus.

10. An e-mail reception method for retrieving e-mail from a server and storing the e-mail in a memory, the method comprising:
　accessing the server to determine whether incoming e-mail to be retrieved is present in the server, the e-mail comprising a header and a body;
　determining whether or not a usage status of the memory meets a predetermined value, when it is determined that the incoming e-mail is present in the server;
　retrieving the e-mail from the server when it is determined that the usage status meets the predetermined value; and
　again accessing the server, after a predetermined time, to determine whether the incoming e-mail is present in the server when it is determined that the usage status does not meet the predetermined value, and retrieving no part of the e-mail, comprising the header and the body, from the server.

11. The e-mail reception method according to claim 10, further comprising repeatedly accessing the server to determine whether the incoming e-mail to be retrieved is present in the server until it is determined that the usage status meets the predetermined value;
　counting a number of times the server is accessed; and
　stopping accessing the server and requesting the server to forward the incoming e-mail present in the server to a predetermined address when the counting reaches a predetermined value.

12. The e-mail reception apparatus according to claim 1, wherein when the controller determines that the usage status does not meet the predetermined value, the controller accesses the server after a predetermined time period to determine whether the incoming e-mail is present in the server without requesting transmission of the e-mail from the server.

13. The e-mail reception method according to claim 10, wherein, when it is determined that the usage status does not meet the predetermined value, e-mail transmission from the server is not requested.

14. The e-mail reception apparatus according to claim 1, wherein the predetermined value comprises a predetermined percentage of memory capacity.

15. The e-mail reception method according to claim 10, wherein the predetermined value comprises a predetermined percentage of memory capacity.

16. An e-mail reception apparatus connected to a server via a network, the e-mail reception apparatus comprising:
　a memory configured to store e-mail retrieved from the server, the e-mail comprising a header and a body;
　a controller configured to access the server to determine whether incoming e-mail, to be retrieved by the e-mail reception apparatus, is present in the server and, when it is determined that the incoming e-mail is present in the server, to determine whether or not a usage status of the memory meets a predetermined value; and
　an e-mail receiver configured to retrieve the e-mail from the server when the controller determines that the usage status meets the predetermined value;
　wherein, when the controller determines that the usage status does not meet the predetermined value, the controller accesses the server after a predetermined time period to determine whether the incoming e-mail is present in the server, without retrieving the header of the e-mail from the server.

* * * * *